Patented June 9, 1953

2,641,588

UNITED STATES PATENT OFFICE 2,641,588

HALOGEN CONTAINING RESIN STABILIZED WITH AN ORGANO TIN COMPOUND

William E. Leistner and Olga H. Knoepke, Brooklyn, N. Y., assignors to Argus Chemical Laboratory, Inc., a corporation of New York No Drawing. Application February 7, 1952, Serial No. 270,532

7 Claims. (Cl. 260—45.75)

This invention relates to an organic tin stabilizer for vinyl resins and to plastic compositions made with said stabilizer. The application is a continuation in part to our application Serial No. 171,549.

The invention is particularly useful in connection with stabilizing polyvinyl chloride resins, although other vinyl halides and copolymers of polyvinyl chloride with vinyl acetate, vinylidene chloride, styrene, and similar compounds may likewise be used.

The organic tin stabilizers which are in most common use today for the above-mentioned resins include such materials as dibutyl tin maleate or the corresponding dilaurate. These stabilizers have the disadvantage of being comparatively inefficient. They have also the disadvantage of being heat sensitive at the high temperatures normally used in the processing of vinyl compounds, their instability causing objectionable discoloration of the plastic. Furthermore, at least occasionally, the stabilizers cause the occurrence of surface bloom and other disfiguring surface changes. Dibutyl tin maleate particularly presents a processing problem due to its tendency to stick to calender surfaces.

In our copending application Serial No. 171,549 we have described a class of stabilizers for polyvinyl resins of the above mentioned type, which is more effective in preventing discoloration and decomposition at elevated temperatures.

The stabilizers according to the invention of our copending application are tin mercaptides of the general formula

In this formula, R' and R² represent monovalent groups containing hydrogen and 1-18 carbon atoms each. Examples of such groups are alkyls, such as methyl, ethyl, butyl, octyl, dodecyl, and octadecyl; aryls, such as phenyl, tolyl, or xylyl; oxyalkyl and oxyaryl, such as $C_3H_7O$, $C_4H_9O$, $C_8H_{17}O$, $C_6H_5O$, $CH_3C_6H_4O$, and $(CH_3)_2C_6H_3O$ and the furfuryl and tetrahydrofurfuryl groups.

In the formula, x is an integral number within the range 1–4. A specific example of the stabilizer used is, for instance, dibutyl tin didodecylmercaptide of the formula

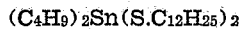

By using from 0.5 to 5 parts of the stabilizers for 100 parts of vinyl resin and compounding the resins by more or less conventional methods, plastic compositions will be obtained which are resistant to discoloration when heated. Furthermore, the stabilizers prevent the formation of bloom and the other deteriorations of plastics occurring during their storage and marring their appearance.

While our invention was, therefore, a considerable improvement in stabilizers for vinyl resins, as compared to those currently in use, we have now discovered a group of compounds which, when used as stabilizers, enable us to obtain still better results.

Generally stated, the present invention relates to stabilizers of the general formula

wherein R' stands for a radical selected from the group consisting of alkyl, aryl, oxyalkyl, oxyaryl, and the furfuryl and tetrahydrofurfuryl radicals, X for a radical of an ester of a mercapto acid having from 2–16 carbon atoms, and n for an integral number from 1–3.

Examples for R' are alkyls, such as methyl, ethyl, butyl, octyl, dodecyl, and octadecyl; aryls, such as phenyl, tolyl, or xylyl; oxyalkyl and oxyaryl, such as $C_3H_7O$, $C_4H_9O$, $C_7H_{17}O$, $C_6H_5O$, $C_6H_3(CH_3)_2O$, and $C_6H_4CH_3O$; and the furfuryl and tetrahydrofurfuryl groups.

Examples for X are esters of thioglycolic acid with n-butyl, sec. butyl, tert. butyl, hexyl, octyl, capryl, dodecyl, cetyl alcohols, butyl carbitol, benzyl, cyclohexyl, methylcyclohexyl, tetrahydrofurfuryl and tetrahydroabietyl alcohols.

Instead of the above indicated esters of thioglycolic acid, we may use the esters of thiopropionic, thiobutyric, thiovalerianic and thiocapronic acids.

Taking as specific esters the butyl tin thioglycolic acid butyl esters, the product may have the following formulae:

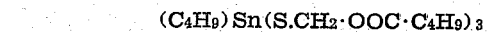

or

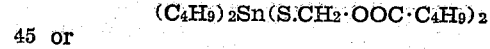

or

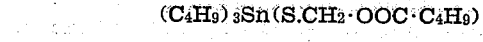

The stabilizer must be substantially non-volatile at ordinary temperatures, stable on exposure to air, light, and to moderately elevated temperatures such as 350° to 450° F., and soluble in the selected vinyl resin, i. e. compatible with the resin to an extent that will permit its use in compounding operations that are usual in this industry.

Examples of the stabilizers which meet these general requirements and which may be used to advantage are the following:

| Name | Formula |
| --- | --- |
| Dibutyl tin dithioglycolic acid cyclohexylester. | $(C_4H_9)_2Sn(S\ CH_2.COO\cdot C_6H_{11})_2$ |
| Dibutyl tin dithioglycolic acid tetrahydroabietylester. | $(C_4H_9)_2Sn(S.CH_2COOC_{20}H_{30})_2$ |
| Monobutyl tin trithiopropionic acid hexylester. | $C_4H_9Sn(S.CH_2.CH_2.COO\ C_6H_{13})_3$ |
| Triphenyl tin thioglycolic acid benzylester. | $(C_6H_5)_3Sn\ S.CH_2COO.CH_2C_6H_5$ |
| Dilauryl tin dithiobutyric butyl ester. | $(C_{12}H_{25})_2Sn(S.CH_2CH_2CH_2COOC_4H_9)_2$ |
| Dibutyl tin dithiobutyric amylester. | $(C_4H_9)_2Sn(S.\overset{C_2H_5}{\underset{|}{C}H}.COOC_5H_{11})_2$ |
| Dipropyl tin dithiovalerianic tetrahydrofurfurylester. | $(C_3H_7)_2Sn(S.\underset{\underset{CH_3}{|}}{C}H\text{-}CH_2.CH_2.COO.C_5H_9O)_2$ |

In general, the resin we use is a vinyl halide resin, this term being used to include vinyl halide polymers; copolymers with vinyl acetate, vinylidene chloride, styrene, dialkyl fumarate or maleate, or other alkyl esters of mono-olefinic acids. The vinyl halide used is ordinarily and preferably the chloride, although others such as the bromide and fluoride may be used.

As regards the proportions, we use 0.5 part to 5 parts of the stabilizer for 100 parts of the vinyl resin. Larger proportions may be used but without any corresponding increase in the stability of the compounded plastic, whereas lower proportions will give products that lack the desired stability. The preferred amount of stabilizer used in commercial operations is from 2 to 3 parts of stabilizer for 100 parts of the resin.

In compounding the resin we may proceed as follows:

For producing a film, weigh the vinyl resin into a dry blender and then add to it our stabilizer, and, if desired, a plasticizer, any colors, pigments, and fillers. Thereupon, the whole mass is agitated, as by tumbling, to produce a uniform blend. The material is then transferred to a Banbury mixer, where it is fused or fluidized at elevated temperatures. Thereafter, the material is dropped and transferred to a warm-up mill and from there to a 3 or a 4 roll calender. Here the material is sheeted out in the form of a film of desired gage.

In making solutions of vinyl resins compounded with the use of our plasticizers, the material is sheeted out in strips directly from the warm-up mill and then dissolved in a churn or suitable mixer after the addition of the selected solvent.

To make extruded products, the sheeted product is transferred to an extruder. Here it is formed into sheets or various shapes or pelleted for molding or subsequent extrusion procedures.

Mixing operations and other processing steps are conventional except as herein stated to the contrary.

The temperature used in making the blends of the compounds is elevated, to cause fluidizing of the mass or to maintain the mass in semifluid condition during such steps as sheeting or extrusion. The temperatures to be used vary with the particular resin used, in manner well known in the art. These temperatures usually fall within the range of 180° to 450° F.

Proceeding in this manner, we make plastic compositions that are resistant to discoloration on heating. Making heat tests at 350° F., for instance, and comparing the polyvinyl chloride plastic containing our stabilizer (a dibutyl- tin dithioglycolic acid ester, for example) with such plastics containing conventional dibutyl tin maleate, we find that the former discolors only about one-third as much in a given period of time and at the same temperatures as does the corresponding vinyl plastic made with the conventional dibutyl tin maleate.

We also conducted comparison heat stability tests on plastics compounded, on the one hand with the stabilizers described in the copending application, and on the other hand with the stabilizers according to the present invention. These tests showed that heating may be carried on for about one hour longer in the latter case without causing any discoloration to occur.

We also found that the compatibility of the stabilizer with the resin is improved, probably because of the presence of the ester solvating group.

In addition, our stabilizers avoid the formation of bloom, the dull or somewhat greasy appearance that sometimes forms on the surface of the plastic-containing conventional stabilizers during normal shelf aging.

We attribute the greater heat stability of plastics containing our stabilizer, in part at least, to the pronounced receptiveness for by-product HCl from decomposition of the resin or to the formation of oxidation products of mercaptan such as disulfides, sulfoxides, and sulfones, the mercaptan itself constituting an anti-oxidant. The absence of the bloom on the treated sheet we attribute to greater compatibility and less tendency to oozing out of the stabilizer or to decreased tendency to separation of products of the thermal decomposition on the surface of the heated plastic.

It should, moreover, be noted that the stabilizers are not only less liable to decomposition than the ones hitherto used, but that on decomposing they are less unpleasant than other mercapto compounds because the mercapto-acids esters split off have a far less penetrating odor than the mercaptans otherwise formed.

The invention will be further illustrated by detailed description in connection with the following examples of the manufacture of plastics with our improved stabilizers and the preparation of the stabilizers themselves.

Example 1

The general procedure of making a film is as follows:

100 parts of vinylite VYNS (vinyl chloride and acetate copolymer) and 2 parts of stabilizer are mixed by tumbling for a period of 1 hour. The stabilizer used is dibutyl tin dithioglycolic acid cyclohexyl ester. The whole mass is then transferred to a Banbury mixer and fused for 10 minutes at a temperature of approximately 300° F.

It is then dropped and transferred to a warm-up mill whose roll temperatures are also at 300° F. The material is then fed as needed to a 3 or a 4 roll calender. The roll temperatures of the calender range from 280°–350° F. The vinyl compound is calendered into a film at .004 inch or any other desirable gage.

*Example 2*

The following procedure is used to advantage in making a finished solution of the resin. We use 100 parts of vinylite VYNS (vinyl chloride and acetate copolymer). This is weighed into a dry blender, 1 part of stabilizer dibutyl tin dithioglycolic acid tetrahydroabietyl ester is then added. The whole mass is agitated by tumbling for 30 minutes and then transferred to a 2-roll mill whose roll temperatures are at about 240° F. The mass is fluidized on the mill and then sheeted into strips which are added to a mixture consisting of 3 parts of methyl ethyl ketone and 1 part of toluene in a conventional mixer. The compound is agitated at room temperature in the mixer until complete solution results. The proportion of solvent used will vary with the concentration of solution desired, as, for instance, from 500 to 3,000 parts of solvent to 100 parts of the vinyl chloride resin used.

*Example 3*

In making an extruded product the following is a preferred procedure. We use 100 parts of Geon 101 weighed into a dry blender along with 40 parts of dioctyl sebacate plasticizer and 2 parts of triphenyl tin thioglycolic acid benzyl ester; 5 parts of titanium dioxide is added as filler. Color is also added. The whole mass is then tumbled for a period of about 1 hour and is then transferred to a Banbury mixer whose temperature is at approximately 300° F., for fusion. The mass is then dropped and transferred to a warm-up mill. Strips are taken off and fed into the hopper of an extruder and the compound is extruded in the form of a solid round rod whose diameter is approximately $\frac{3}{8}$ inch. The rod of compound is cooled and sliced to form small pellets. These pellets are then used for the extrusion of vinyl strips or sheets or to cover copper wire for insulation purposes.

*Example 4*

The procedure of Examples 1, 2, or 3 is followed with the exception that any one of the stabilizing agents referred to above is substituted on a pound for pound basis for the stabilizer used in any of the above examples.

*Example 5*

The procedure of Examples 1–4 is followed with the exception that any one of the vinyl resins listed herein is substituted on a pound for pound basis for the polyvinyl resin in these examples.

Products made as described are satisfactorily stable when exposed to heat or light under usual conditions of storage or use and do not bloom when warmed.

*Example 6*

The preparation of dibutyl tin dithioglycolic acid cyclohexylester $$(C_4H_9)_2—Sn—(S.CH_2.COOC_6H_{11})_2$$

92 grams of thioglycolic acid (1 mol) and 100 grams of cyclohexanol (1 mol), to which are added 0.3 gram of para-toluene sulfonic acid and 150 ml of benzene, are refluxed until the calculated amount of water is eliminated by azeotropic distillation.

124 grams ($\frac{1}{2}$ mol) dibutyl tin oxide are then added and the liquid is boiled until the theoretical amount of water has been stripped off, the dibutyl tin oxide having completely dissolved by that time. Slight impurities are filtered off and the benzene is distilled off. The residue is a very viscous liquid of a slightly yellowish color. It is soluble in ether, chloroform, carbontetrachloride, benzene, toluene, xylene, and other organic solvents.

Analysis:

Calc. values
$C = 49.8$, $H = 7.5$, $S = 11.1$, $Sn = 20.4$
Found values
$C = 49.5$, $H = 7.7$, $S = 11.3$, $Sn = 19.9$

*Example 7*

Preparation of dibutyl tin dithioglycolic acid tetrahydroabietyl ester:

$$(C_4H_9)_2—Sn—(S.CH_2.COOC_{20}H_{30})_2$$

In the same way as described in Example 1, we first esterify thioglycolic acid with tetrahydroabietyl alcohol by reacting 287 grams of the alcohol with 92 grams of the acid adding 0.5 grams para-toluene sulfonic acid in 150 ml benzene. The reaction with dibutyl tin oxide is then performed as described in Example 1, half a mol of dibutyl tin oxide being added. The product obtained is very similar to the one described in Example 1.

Analysis:
Calc. values _____ $Sn = 12.4$, $S = 6.7$
Found values _____ $Sn = 12.0$, $S = 6.6$

*Example 8*

Preparation of triphenyl tin thioglycolic acid benzyl ester:

$$(C_6H_5)_3Sn—S.CH_2.COO.CH_2.C_6H_5$$

11 grams benzyl alcohol ($\frac{1}{10}$ mol)
9.2 grams thioglycolic acid ($\frac{1}{10}$ mol)

are reacted in 60 cc. of benzene in the presence of 0.2 gram para-toluene sulfonic acid in the manner described in Example 1. To the ester obtained in the reaction we add 43 grams of triphenyl tin bromide ($\frac{1}{10}$ mol). The liquid is refluxed for one hour. The benzene solution is then washed with water in order to remove the H Br formed in the reaction. After filtering off the impurities and distilling the benzene, we obtain a product which is in appearance and properties similar to the product obtained according to Example 1.

Analysis:
Calc. value _____ $Sn = 22.26$, $S = 6.04$
Found value _____ $Sn = 22.0$, $S = 6.1$

What we claim is:

1. A plastic composition having improved heat stability at temperatures of about 350° F. and improved surface appearance after storage, said plastic composition comprising a blend of a polyvinyl halide and a stabilizer therefor, said stabilizer having the general formula $$R'_n—Sn—X_{4-n}$$

wherein R' represents a radical selected from the group consisting of alkyl, aryl, oxyalkyl, oxyaryl, and the furfuryl and tetrahydrofurfuryl radicals, X an ester of a mercaptoacid having from 2–6 carbon atoms, whose sulfur atom is linked to the tin, and $n$ an integral number from 1–3.

2. A plastic composition as claimed in claim 1 wherein the polyvinyl halide is polyvinyl chloride.

3. A plastic composition comprising a polyvinyl halide and as a stabilizer therefor dibutyl tin dithioglycolic acid cyclohexylester.

4. A plastic composition comprising a polyvinly halide and as a stibilizer therefor dibutyl tin dithioglycolic acid tetrahydroabietylester.

5. A plastic composition comprising a polyvinyl halide and as a stabilizer therefor monobutyl tin tribetathiopropionic acid hexyl ester.

6. A plastic composition comprising a polyvinyl halide and as a stabilizer therefor dilauryl tin dithiobutyric acid butylester.

7. A plastic composition comprising a polyvinyl halide and as a stabilizer therefor triphenyl tin thioglycolic acid benzylester.

WILLIAM E. LEISTNER.
OLGA H. KNOEPKE.

No reference cited